Patented Mar. 17, 1942

2,276,621

UNITED STATES PATENT OFFICE 2,276,621

PREPARATION OF METHYL GLUCOSIDES

David P. Langlois, Decatur, Ill., assignor to A. E. Staley Manufacturing Company, Decatur, Ill., a corporation of Delaware No Drawing. Application September 27, 1939, Serial No. 296,869

8 Claims. (Cl. 260—210)

The present invention relates to the preparation of glucosides and has particular reference to an improved process for the effective formation and recovery of methyl glucosides from carbohydrates.

Methyl glucosides have been known for many years and customarily are produced by an acetal formation reaction between a carbohydrate and methanol in the presence of a concentrated mineral acid. Although these products are of considerable interest their use in industry has been retarded by reason of the expensive and relatively inefficient methods for their manufacture which have been known heretofore.

A principal object of the present invention is the provision of an improved process for the formation and recovery of methyl glucosides in which a particularly high yield is obtained.

An additional object of the invention is the preparation of alpha methyl glucosides from carbohydrates generally and preferably from starch by a process involving the synthesis of alpha methyl glucoside in the presence of a disequilibrate methyl glucoside product deficient in alpha methyl glucoside.

Still another object of the invention is to provide a method of forming a specific methyl glucoside by effecting the methyl glucoside synthesis in the presence of a strong acid and a disequilibrate methyl glucoside product deficient in the specific methyl glucoside, the amount of the carbohydrates entering the reaction being substantially the equivalent of the deficiency of the methyl glucoside product in the specific methyl glucoside it is desired to form.

These and other objects will be observed upon a consideration of the following specification in which is described a preferred embodiment of the invention.

As before stated, the various methyl glucosides generally are produced by effecting an acetal-forming reaction between a carbohydrate and methanol, the resulting reaction product containing alpha methyl glucoside, beta methyl glucoside and other methyl glucosides or isomers in a condition of equilibrium. Where it is desired to produce alpha methyl glucosides this product has been crystallized directly from the reaction mixture. The remainder of the reaction mixture can be again heated to restore equilibrium conditions by the formation of further quantities of alpha methyl glucoside from the other glucosides. Further crystallization increases the total yield of alpha methyl glucoside, but relatively long periods of time are involved and the yields of subsequent recoveries become increasingly small.

The present invention is based upon the discovery that substantially quantitative amounts of specific glucosides can be produced by effecting the glucoside conversion of a carbohydrate and alcohol in the presence of a previously formed disequilibrate glucoside product deficient in the specific glucoside which it is desired to produce substantially to the extent of the glucoside which can be produced from the carbohydrate.

A principal application of the invention resides in the production of alpha methyl glucosides and the process will be described more particularly with respect to this application.

Most of the work which has been done heretofore in the production of methyl glucosides includes the use of dextrose as a starting material and this material can be used in accordance with the present process. However, I have found that considerably better results can be obtained by the use of starch as a starting material. It will be understood that carbohydrates which form glucose in general can be employed. The methyl glucoside reaction is similar to other acetal-forming reactions and includes combination of glucose with methanol, accompanied by the elimination of one molecule of water. A number of methyl glucosides result from the reaction of glucose and methanol, these glucosides including alpha methyl glucoside, beta methyl glucoside, alpha methyl glucofuranoside and beta methyl glucofuranoside. The reaction is one in which an equilibrium is reached between the various glucosides. Alpha methyl glucoside is much more soluble in water or aqueous methanol than in anhydrous methanol, so that the formation of water in the reaction tends to lower the yield of alpha methyl glucoside as obtained by direct crystallization. In the hydrolysis of starch to glucose the glucose is formed by the addition of 1 molecule of water. Where this reaction occurs in situ with the formation of methyl glucoside the molecule of water necessary for formation of glucose may be obtained from the reaction between methanol and glucose, thereby preventing the amount of free water in the process from increasing. For this reason it is preferred to employ starch in the process, since this material provides a high yield of alpha methyl glucoside.

The methyl glucoside reaction is carried out in the presence of a strong mineral acid catalyst, and sulfuric acid is preferred. The sulfuric acid can be obtained commercially in highly concentrated form, so that the acid does not add much water to the reaction mixture. Hydrochloric acid and hydrogen chloride gas also have been used in the reaction.

An initial step of the process consists of the formation of an equilibrium reaction mixture of methyl glucosides by the reaction of starch and methanol in the presence of concentrated sulfuric acid. An excess of methanol is employed in the process so that practically all of the carbohydrate material will be present as mixed methyl glucosides. The starch methanol and sulfuric acid are heated and mixed until the reaction is complete. This mixture will be concentrated to about 35 to 40 per cent solids and allowed to crystallize. The product crystallizing from the mother liquor will consist of relatively pure alpha methyl glucoside which may be filtered off and further re-crystallized if desired. The remaining mother liquor resulting from this crystallization then is employed as an important factor in subsequent conversions of starch to methyl glucoside. This mother liquor is a disequilibrate solution of methyl glucosides deficient in alpha methyl glucoside. As a next step in the process a further quantity of starch and methanol is reacted together in the presence of sulfuric acid and the mother liquor to form further quantities of methyl glucoside, the amount of starch being sufficient to produce a quantity of methyl glucoside corresponding to the deficiency of alpha methyl glucoside in the mother liquor. The reaction may be followed polarimetrically and is complete when there is no further change in rotation.

The reaction mixture is taken from the converter in which it is produced and run to an evaporator when an amount of methanol is removed to bring the resulting liquor to a concentration of about 35 to 40 per cent solids. The mixture from the evaporator is run to a crystallizer and allowed to crystallize with or without stirring for several hours. Generally 24 hours will be sufficient to complete the crystallization. It is significant to note that the entire quantity of material crystallized at this point will be found to be alpha methyl glucoside and that the amount of alpha methyl glucoside further will be found to correspond to substantially all of the starch which was added to the reaction mixture and converted in the presence of the disequilibrate methyl glucoside mixture.

The mixture from the crystallizer may be run to a centrifuge or other suitable filter. The resulting filter cake may be washed with cold methanol.

The mother liquor recovered from the crystallized alpha methyl glucoside produced in the second major step of the process again is employed as the reaction situs of further quantities of starch and methanol, the operation being repeated as many times as desired or until the accumulation of byproducts is so great as to render further conversions with the original mother liquor impractical.

It will be seen that in the operation of my improved process the starch is in a single conversion changed completely to alpha methyl glucoside. The process by which this high yield is obtained is quite simple and merely involves effecting the methyl glucoside reaction in the presence of a disequilibrate mixture of methyl glucosides deficient in alpha methyl glucoside.

The amount of methanol used in the process may vary considerably, it being preferred to employ an excess of methanol in order to increase the yield. The methanol to solids weight ratio in the initial step may be of the order of 3 to 1. The quantity of sulfuric acid used as a catalyst likewise may vary considerably. Approximately 10 per cent sulfuric acid based on the methanol may be employed. Lower percentages generally increase the amount of time required for the conversion. It also is preferred to employ pressure equipment in the conversion and to carry out the process at a temperature between 65° C. and 100° C. The reaction rate at 100° C. is almost 25 times as fast as at 65° C.

As a specific example of the production and recovery of alpha methyl glucosides from methanol starch and sulfuric acid, the following is given.

The process was started by mixing 6 parts of methanol containing 10 per cent by weight of 95 per cent sulfuric acid with 2 parts of starch and heating under pressure at 100° C. for 2 hours. The mixture was concentrated to about 40 per cent solids, cooled, and allowed to crystallize. After 24 hours the alpha methyl glucoside was filtered off and the mother liquor was used as the starting point for subsequent runs.

Three parts of the mother liquor were mixed with 1 part dry starch, 4 parts of methanol, and sufficient sulfuric acid to bring the sulfuric acid content of the mixture up to 10 per cent of the methanol. The mixture was again heated under pressure at 100° C. for 2 hours. Thereafter the mixture was concentrated at 40 per cent solids and cooled and crystallized. After 24 hours crystallization the alpha methyl glucoside which precipitated was filtered and washed. The yield was found to be between 1.1 and 1.2 parts by weight or between 90 and 100 per cent of the theoretical quantity based upon the starch entering the process.

Other specific methyl glucosides can be produced in a manner corresponding to that described with respect to the production of alpha methyl glucosides. For example, beta methyl glucoside is prepared from a disequilibrate methyl glucoside product deficient in beta methyl glucoside and a carbohydrate and methanol. One instance of such preparation may be had by reacting 1 part of starch, 6 parts of methanol and 0.6 part of sulfuric acid in the presence of 1 part by weight of alpha methyl glucoside, the mixture being heated under pressure at 100° C. for about 2 hours. The resulting almost quantitative production of beta methyl glucoside then is recovered by crystallizing out the alpha methyl glucoside.

Glucosides other than methyl glucoside can be produced in a manner corresponding to that described herein. By substituting ethyl alcohol the corresponding ethyl glucosides will be produced. Similarly by using anhydrous propyl there will be produced propyl glucoside.

The method of separation of a specific glucoside to produce a disequilibrate solution will depend upon the physics or chemistry of that product. For instance, alpha ethyl glucoside may be recovered by crystallization from ethyl acetate. In each instance the process depends upon repetition of the glucoside formation in the presence of a disequilibrate glucoside product to produce substantially quantitative conversion to the desired glucoside, followed by separation to again produce a disequilibrate product.

Many changes may be made in the process described herein without departing from the scope of the invention as defined in the appended claims.

I claim:

1. The process of forming a specific methyl glucoside, which comprises effecting a methyl glucoside reaction between a carbohydrate which will hydrolyze to glucose and methanol in contact with a mineral acid catalyst and a methyl glucoside product deficient in said specific methyl glucoside and cooling to product crystallization.

2. The process of forming alpha methyl glucoside, which comprises producing a methyl glucoside reaction between a carbohydrate which will hydrolyze to glucose and methanol in contact with a mineral acid catalyst and a methyl glucoside product deficient in alpha methyl glucoside, the amounts of said carbohydrate and methanol being in excess of the amount needed to complete the reaction to provide an amount of methyl glucoside corresponding to the deficiency of said product in alpha methyl glucoside and cooling to produce crystallization.

3. The process of forming alpha methyl glucoside, which comprises producing a methyl glucoside reaction between starch and methanol in contact with approximately 10 but not to exceed 20 percent of sulfuric acid as a catalyst and a methyl glucoside product deficient in alpha methyl glucoside, the amounts of the starch and methanol being in excess of the amount needed to complete the reaction to provide a quantity of methyl glucoside corresponding to the deficiency of alpha methyl glucoside in said product, whereby an equilibrium methyl glucoside reaction mixture is obtained, and crystallizing alpha methyl glucoside from said mixture by cooling to restore said deficient condition.

4. The process of forming a specific methyl glucoside which comprises effecting a glucoside conversion of a carbohydrate which will hydrolyze to glucose and methanol in contact with a mineral acid catalyst and a previously formed methyl glucoside product deficient from the standpoint of equilibrium in said specific methyl glucoside by cooling to produce crystallization.

5. The process of forming alpha methyl glucoside, which comprises crystallizing alpha methyl glucoside from a mixture of glucosides, producing a glucoside-forming reaction between starch and methanol in contact with approximately 10 but not to exceed 20 per cent of sulfuric acid as a catalyst and the remainder of said mixture after removal of said alpha methyl glucoside, and crystallizing by cooling a further quantity of alpha methyl glucoside from said reaction mixture.

6. The process of forming alpha methyl glucoside, which comprises producing a methyl glucoside product deficient in alpha methyl glucoside, effecting a methyl glucoside reaction between starch and methanol in contact with a mineral acid catalyst and said product, and recovering alpha methyl glucoside from the reaction mixture by cooling to produce crystallization.

7. The process of making a methyl glucoside, which comprises producing a mixed glucoside-forming reaction between a carbohydrate which will hydrolyze to glucose and methyl alcohol in contact with a mineral acid catalyst, removing alpha methyl glucoside from the resulting equilibrium mixture of glucosides by cooling to produce crystallization, adding further quantitites of a carbohydrate which will hydrolyze to glucose to the remainder of said mixture, reacting said further quantities of carbohydrate with methyl alcohol in contact with the remainder of said mixture, and recovering further quantities of alpha methyl glucoside therefrom by further cooling to produce crystallization.

8. The process of making a specific methyl glucoside, which comprises converting a carbohydrate and methanol to a liquid equilibrium mixture of glucosides, removing a glucoside from said mixture by cooling to produce crystallization to produce a glucoside product which is not in equilibrium, and effecting a further glucoside conversion of a carbohydrate which will hydrolyze to glucose and methanol in contact with said product, said reaction occurring in contact with a mineral acid catalyst.

DAVID P. LANGLOIS.